United States Patent [19]
Elmore et al.

[11] Patent Number: 5,139,620
[45] Date of Patent: Aug. 18, 1992

[54] DIMPLE PLATE HORIZONTAL EVAPORATOR EFFECTS AND METHOD OF USE

[75] Inventors: Carl E. Elmore; Kyle Infante, both of Glens Falls, N.Y.

[73] Assignee: Kamyr, Inc., Glens Falls, N.Y.

[21] Appl. No.: 566,224

[22] Filed: Aug. 13, 1990

[51] Int. Cl.$^5$ .................. B01D 1/22; B01D 1/26; B01D 3/10

[52] U.S. Cl. .................................. 203/11; 203/1; 203/22; 203/25; 203/26; 203/40; 203/72; 203/74; 203/80; 203/94; 203/DIG. 14; 159/17.1; 159/DIG. 22; 159/47.3; 165/166; 202/173; 202/174; 202/177; 202/181; 202/197; 202/202; 202/205; 202/236

[58] Field of Search ............... 202/174, 173, 177, 202, 202/197, 181, 182, 236, 205; 159/17.1, 17.2, 20.1, 24.1, 24.2, 28.6, 13.1, 47.1, 47.3, 49, 46, DIG. 8, DIG. 22, DIG. 31, 901; 203/10, 11, 40, 72, 26, 22, DIG. 14, 1, 25, 94, 74, 80; 165/166, 167

[56] References Cited

U.S. PATENT DOCUMENTS

| | | | |
|---|---|---|---|
| 1,200,996 | 10/1916 | Soderlund | 159/17.2 |
| 2,759,882 | 8/1956 | Worthen et al. | 202/174 |
| 3,211,219 | 10/1965 | Rosenblad | 165/166 |
| 3,251,397 | 5/1966 | Lens | 159/17 |
| 3,512,239 | 5/1970 | Rosenblad | 29/157.3 |
| 3,824,154 | 7/1974 | Takada et al. | 159/DIG. 8 |
| 3,824,155 | 7/1974 | Takada | 202/174 |
| 3,849,259 | 11/1974 | Steinbruchel | 159/DIG. 8 |
| 3,868,308 | 2/1975 | Barak et al. | 159/17.2 |
| 3,941,663 | 3/1976 | Steinbruchel | 159/DIG. 8 |
| 4,007,094 | 2/1977 | Greenfield et al. | 159/17.1 |
| 4,217,176 | 8/1980 | Antony | 159/24.2 |
| 4,511,436 | 4/1985 | el Din Nasser | 202/174 |
| 4,673,459 | 6/1987 | Elmore et al. | 159/20.1 |
| 4,712,612 | 12/1987 | Okamoto et al. | 165/146 |

FOREIGN PATENT DOCUMENTS 2035815 6/1980 United Kingdom .
2123307 2/1984 United Kingdom .

OTHER PUBLICATIONS

Awerbuch et al., "Desalination Technology Report on the State of the Art", Bechel Group, Inc.
Kamyr, Inc. "Falling Film Evaporators", Bulletin No. KGD1807-ME0689.
The U.S.A.I.D. Desalination Manual, Chapter 3, "Distillation", 1980.

Primary Examiner—Wilbur Bascomb, Jr.
Attorney, Agent, or Firm—Nixon & Vanderhye

[57] ABSTRACT

Evaporation of saline water in a desalinization process, or evaporation of other types of liquid such as black liquor from paper pulp processing, is accomplished utilizing a multiple effect evaporator. Each effect includes one or more (e.g. first and second) sets of horizontally elongated dimpled plate evaporator elements. Horizontally flowing heating fluid, such as steam, is introduced to the internal passage of at least the second set in all the effects, and a head of circulation liquid is provided to cause liquid being evaporated to flow downwardly from the head over the external surfaces of the sets of dimpled plates in a thin film. The vapor evaporated is drawn through a demistor and is used as the heating fluid for the next effect. Recirculating liquid that has not evaporated and liquid separated by the demisting process are recirculated to the head associated with each effect. Clean condensate—such as distilled water—is withdrawn from the last effect. The liquid to be evaporated may be preheated by passing it through the first sets of dimpled plates countercurrent to the flow of vapor. A vapor compressor may be used to raise the temperature of the vapor withdrawn from the last effect and return it to the heating fluid inlet of the first effect.

30 Claims, 6 Drawing Sheets

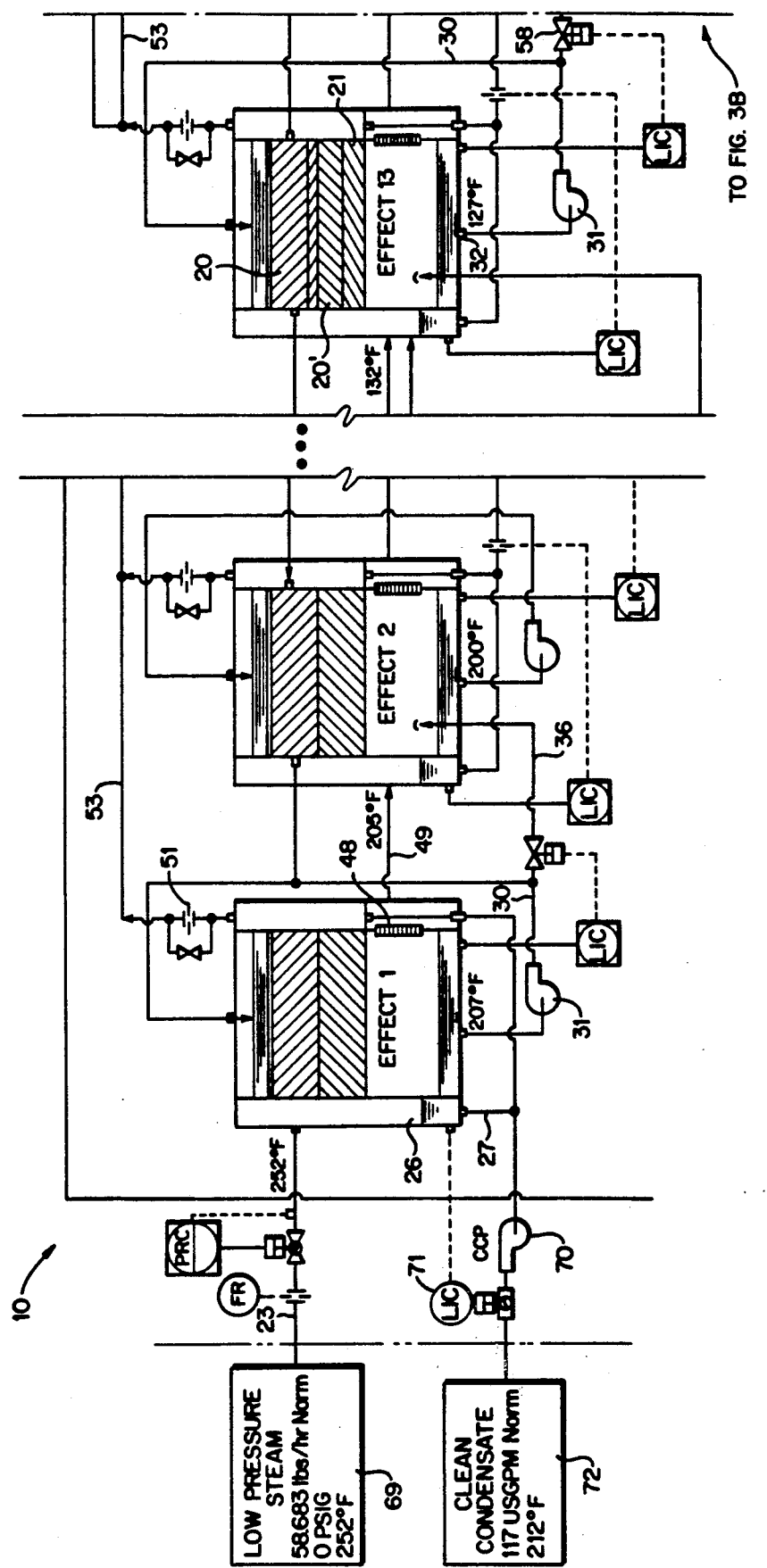

DIMPLE PLATE HORIZONTAL EVAPORATOR EFFECTS AND METHOD OF USE

BACKGROUND AND SUMMARY OF THE INVENTION

The invention relates to an evaporator, a method of evaporating an evaporable liquid, and individual evaporator effects, that are particularly advantageous for a number of particular processes. The invention is particularly applicable to—although not limited to—desalination of water, wash water, and evaporation of black liquor during paper pulp processing.

Conventional evaporators for water desalinization typically comprise multiple effect evaporators having a plurality of heat transfer tubes. Both vertical tube evaporators and horizontal tube evaporators are utilized. The brine is typically sprayed on the outsides of the tubes to produce vapor. The water vapor generated by the brine flows to the next effect, where it supplies heat for additional evaporation at a lower temperature. The brine may be partially preheated by a fraction of the vapor, and flow countercurrently with the steam. Most often prime steam and downstream vapors flow inside the horizontal tubes, where they condense and contribute to the product water stream.

Conventional multi-effect evaporators used for evaporating black liquor from paper pulp processing are the vertical type, having vertically elongated dimpled plates as the heating elements, such as plates shown—for example—in U.S. Pat. Nos. 3,211,219 and 3,512,239 (the disclosures of each are incorporated by reference herein).

According to the present invention there is provided a multi-effect evaporator, a method of effecting evaporation utilizing a multiple effect evaporator, and individual effects of an evaporator, which have a number of advantageous features. Each of the effects according to the present invention comprises horizontally elongated dimpled plates. The dimpled plates are disposed in one or more sets, one stacked above the other. The dimpled plate horizontal element construction has a uniform liquor distribution, relatively little vapor pressure drop between the heating elements, and good droplet separation (minimized carryover), as well as high heat transfer coefficients. Thus it is advantageous compared to conventional horizontal tubular evaporators. Also, it has an economic advantage with respect to the known vertical dimpled plate evaporators used in paper pulp processing. According to the invention 15 to 20% better packing can be achieved in the same space than for comparable vertical dimpled plate evaporators, resulting in a generally corresponding savings in capital investment.

According to one aspect of the present invention there is provided a method of evaporating an evaporable liquid utilizing a multiple effect evaporator. In the multiple effect evaporator each effect has one or more (e.g. first and second) sets of horizontally elongated dimpled plate evaporator elements, the elements as shown in said U.S. Pat. Nos. 3,211,219 and/or 3,512,239. Each set has an internal passage and an external surface, and the first set is disposed on top of the second set, etc. The effects are connected in series and include a first, highest temperature effect, and a last, lowest temperature effect. The method comprises the following steps (when using first and second sets): (a) Introducing horizontally flowing heating fluid into the internal passage of both sets of elements of the first effect, and into the internal passage of at least the second set in all subsequent effects. (b) Providing a head of circulation liquid to be evaporated at the top of the first set of each effect. (c) Causing the liquid to flow downwardly from the head over the external surfaces of the first and second sets of each effect. (d) Withdrawing the vapor of evaporated circulation liquid from each effect while demisting it to separate entrained liquid from the vapor. (e) Recirculating circulation liquid that has not evaporated to the head associated with that effect. (f) Horizontally feeding the withdrawn vapor from each effect to the next effect as the fluid provided in step (a) thereof, except for the last effect. And, (g) withdrawing clean condensate from the last effect. There may also be the further step (h) of preheating the liquid to be evaporated before introducing it into the head of the first effect by passing it through the internal passages of the first sets of all the other effects except the first effect, the liquid flowing countercurrent to the vapor passing from the first effect to the last effect through the second sets' internal passages. There may also be the further step (i) of compressing the vapor withdrawn from the last effect to increase the temperature thereof, and providing the compressed vapor to the first effect as the heating fluid in step (a). Still further there may be the further step (j) of removing non-condensable gases from each effect, and recovering a major portion of the heat value from the non-condensable gases before discharge thereof. For each effect except the last effect, between steps (f) and (a) there may be an additional step of collecting condensate, and passing and flashing the condensate so collected to the next effect.

The invention is particularly useful in the desalinization of water, to produce fresh water from sea water, but may also be used to evaporate black liquor from a paper pulp producing procedure, or act upon like liquors.

According to another aspect of the present invention an evaporator effect is provided. The evaporator effect comprises: A horizontally elongated vessel, having a top, bottom, first end, and second end. One or more sets of elongated (in a dimension of elongation) dimpled plate evaporator elements, defining an interior passage, and having an exterior surface. When it is provided, a second set of elongated in a dimension of elongation dimpled plate evaporator elements also defines an interior passage, and has an exterior surface. Means for introducing heating fluid into the interior passage of at least the second set of dimpled plate evaporator elements. Means for mounting the first and second sets of dimpled plate evaporator elements so that they are disposed in the vessel with their dimension of elongation horizontal, with the first set above the second set. Means for introducing circulation liquid to be evaporated adjacent the top of the vessel so that it falls over the exterior surfaces of the first and second sets of elements in a falling film, to cause some of the circulation liquid to be evaporated. A demistor mounted within the vessel. Means for withdrawing evaporated circulation liquid from the vessel through the demistor. Means for causing circulation liquid not evaporated to collect separately at the bottom of the vessel. And, a circulation liquid outlet from the bottom of the vessel. The means for introducing circulation liquid preferably comprises an open top, closed bottom tray mounted above the elements, with means defining a plurality of openings in the tray bottom. Means also may be provided for introducing liquid to be preheated into the interior passage of dedicated (e.g. the first set of) elements, to flow countercurrently to the fluid introduced into the interior passage of the second set of elements.

According to still another aspect of the present invention, a multi-stage evaporator having a plurality of effects which are interconnected into a series of effects is provided. The series of effects includes a first, highest temperature, effect to a last, lowest temperature, effect. Each effect in the series is as described above. For each effect, except the first effect, the means for introducing heating fluid is connected to the means for withdrawing evaporated circulation liquid from the previous effect. A dividing wall is also provided adjacent the elements of each effect to define—with the bottom of the vessel—a condensation chamber. An outlet is provided from the bottom of the condensation for passing this "clean" condensate to the similar condensate chamber to flash in the next effect, and exit from the last effect.

It is the primary object of the present invention to provide for effective evaporation of an evaporable liquid utilizing a multiple effect evaporator. This and other objects of the invention will become clear from an inspection of the detailed description of the invention, and from the appended claims.

DETAILED DESCRIPTION OF THE DRAWINGS

Figure 1:
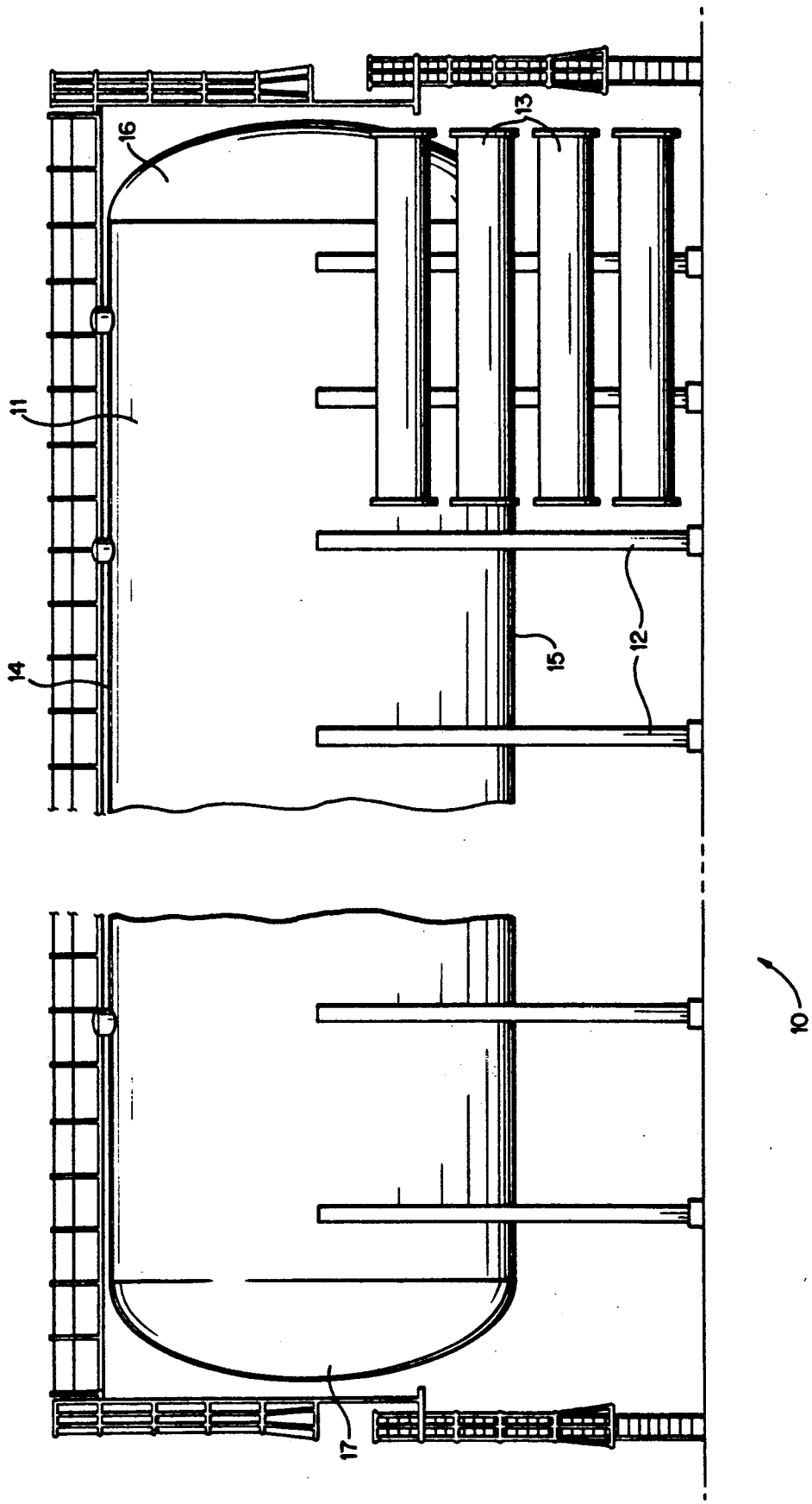
FIG. 1 is a side elevational view of an exemplary multiple effect evaporator vessel according to the present invention for a desalination evaporator.

FIG. 1, generally by reference numeral 10, illustrates a multiple effect evaporator according to the present invention. The evaporator includes a horizontally elongated vessel 11 supported by a plurality of legs 12, with a number of heating and like elements 13 at one end thereof. For the embodiment actually illustrated in FIG. 1, the vessel 11 would be, e.g. about 400 feet long, and would include fourteen effects. However the invention is not limited to the particular number of effects and any plurality of effects less than or more than fourteen may be provided. The vessel 11 has a top 14, bottom 15, and first and second ends 16, 17, respectively.

Figure 2:
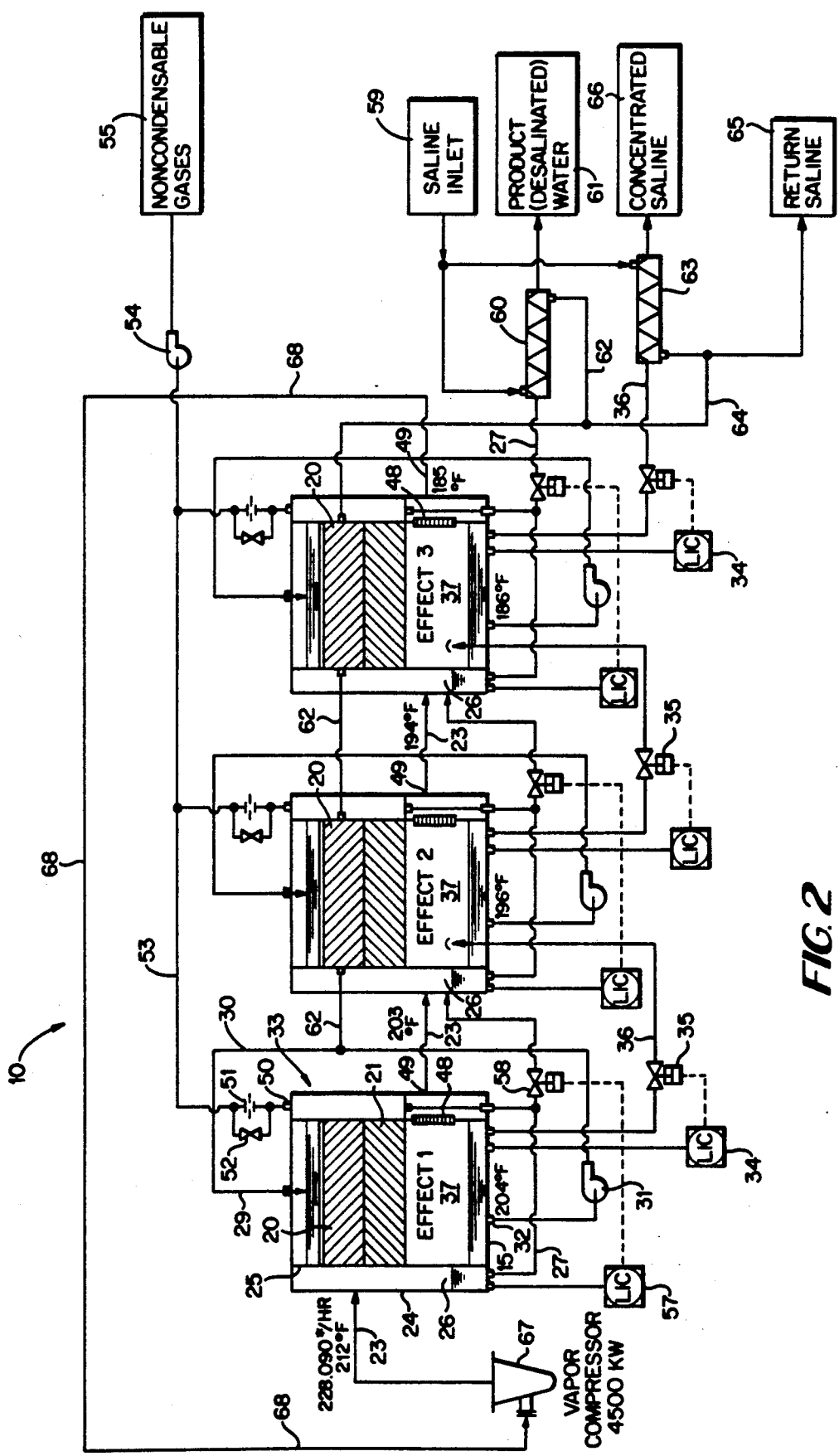
FIG. 2 is a schematic illustration of three stages of a multiple effect evaporator with vapor compressor that could be utilized in the vessel of FIG. 1.

One simple form that the evaporator 10 according to the invention could take is illustrated in FIG. 2. In this figure only three effects are illustrated, the first effect (effect 1) being the highest temperature and pressure effect, and the last effect (effect 3) being the lowest temperature and pressure. Each effect includes one or more (at least one) sets of elements. For example, each set includes a first set of horizontally elongated dimpled plate evaporator elements shown generally by reference numeral 20, and a second set of horizontally elongated dimpled evaporator elements 21. Each set 20, 21 can be formed of many dimpled plates disposed in pairs, the pairs of dimpled plates spaced from each other. For example there may be over 200 pairs of plates in each set 20, 21.

The dimpled plates themselves are as in said U.S. Pat. Nos. 3,211,219 and 3,512,239, the disclosures of which have been incorporated by reference herein. As such each pair has an interior passage, and an exterior surface. The first set 20 is above the second set 21, and the second set 21 is supported by means for mounting the sets so that they are horizontal. See, for example, the support beam 22 in FIG. 4, which is a typical construction for supporting the elements 20, 21 in the vessel 11. While only two sets of dimpled plate evaporator elements are described in the majority of the following description, third, and even fourth or other sets of plates may also be provided stacked one above the other, or only one set need be provided For example see the third set 20' illustrated for effect 13 in FIG. 3, which is disposed between the first and second effects.

Means are provided for introducing heating fluid into the interior passage of at least the second set of dimpled plate evaporator elements 21; for the first effect, the heating fluid will be introduced into both sets 20, 21. Such means preferably includes—for the first effect—a conduit 23 extending to the outer wall 24 of the first effect 1, an inner pressure wall 25 also being provided separating the rest of the first effect from the second effect, except for the interior passages in the sets 20, 21. At the vessel bottom 15 of the first effect a condensation chamber, shown generally by reference numeral 26, is provided. An outlet for "clean" condensate extends from that condensation chamber 26. Any of the vapor of the heating fluid introduced horizontally into the interior passages of the first effect that condenses will collect in the chamber 26.

Each effect of the evaporator 10 of FIG. 2—such as the first effect—also has means for introducing circulation liquid to be evaporated adjacent the top of the vessel so that it falls over the exterior surfaces of the elements 20, 21 so that some of the circulation liquid is evaporated. The circulation liquid introduction means preferably comprises the vertically extending conduit portion 29 which is connected to the recirculating conduit 30 and pump 31, which withdraws circulation liquid and the like through the outlet 32 in the bottom 15 of the vessel 11. The conduit 29 leads into a tray 33 at the top of the effect, and a "head" or level of liquid—as schematically illustrated in FIGS. 2 through 4 and 6—is provided in the tray 33. Typically the tray 33 has a depth of more than one inch. The level of liquid in each effect is controlled by the level controller 34 which operates the valve 35 in a line 36 extending from the circulation liquid collecting bottom portion (or sump) 37 of each effect.

The tray 33 typically has a horizontally extending bottom 38 (see FIG. 5) with means defining a plurality of regularly spaced openings 39 therein, allowing an even flow and distribution of circulation liquid through the bottom 38 of the tray 33 to flow in a film over the external surfaces of the elements in the sets 20, 21.

Figure 4:
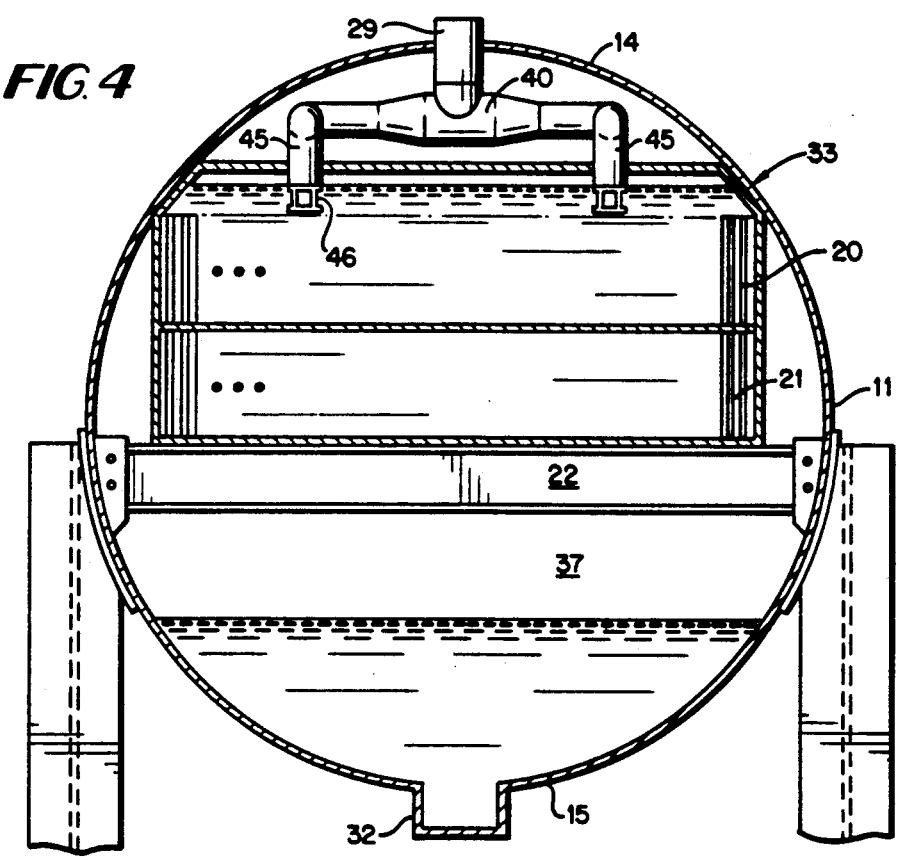
FIG. 4 is an end schematic view of the vessel of FIG. 1 illustrating one effect.
Figure 5:
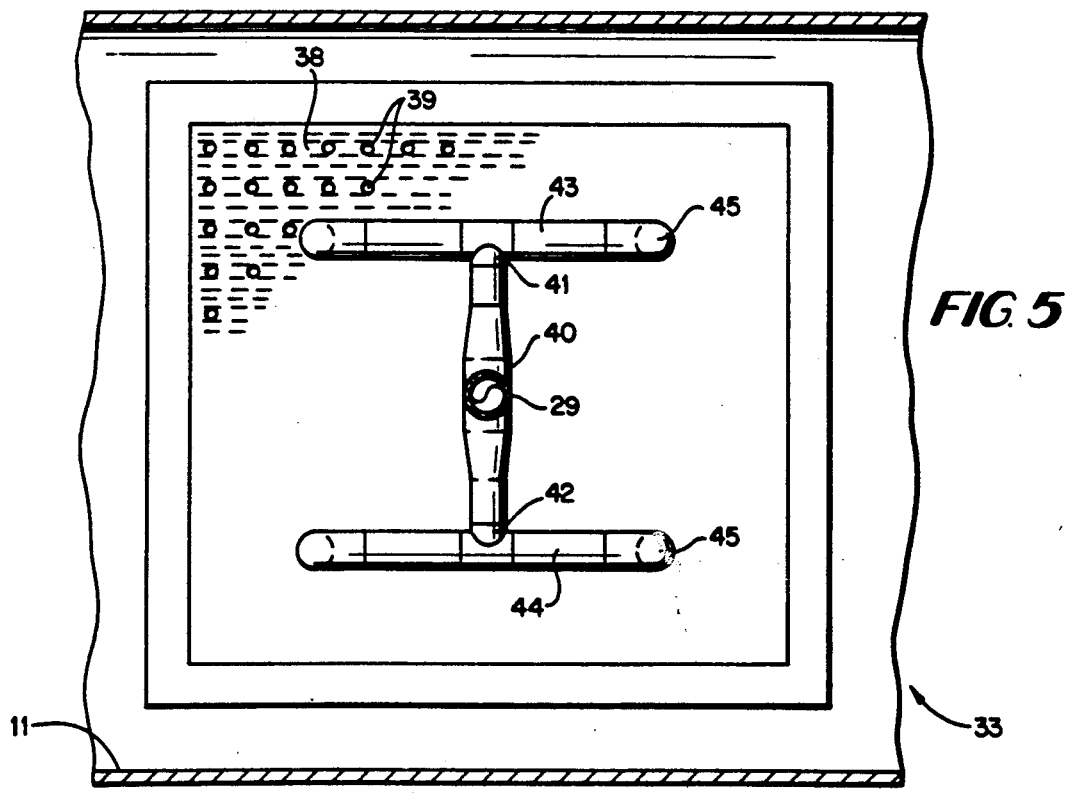
FIG. 5 is a top plan view of the circulation liquid distribution system for the evaporator of FIG. 4.
Figure 6:
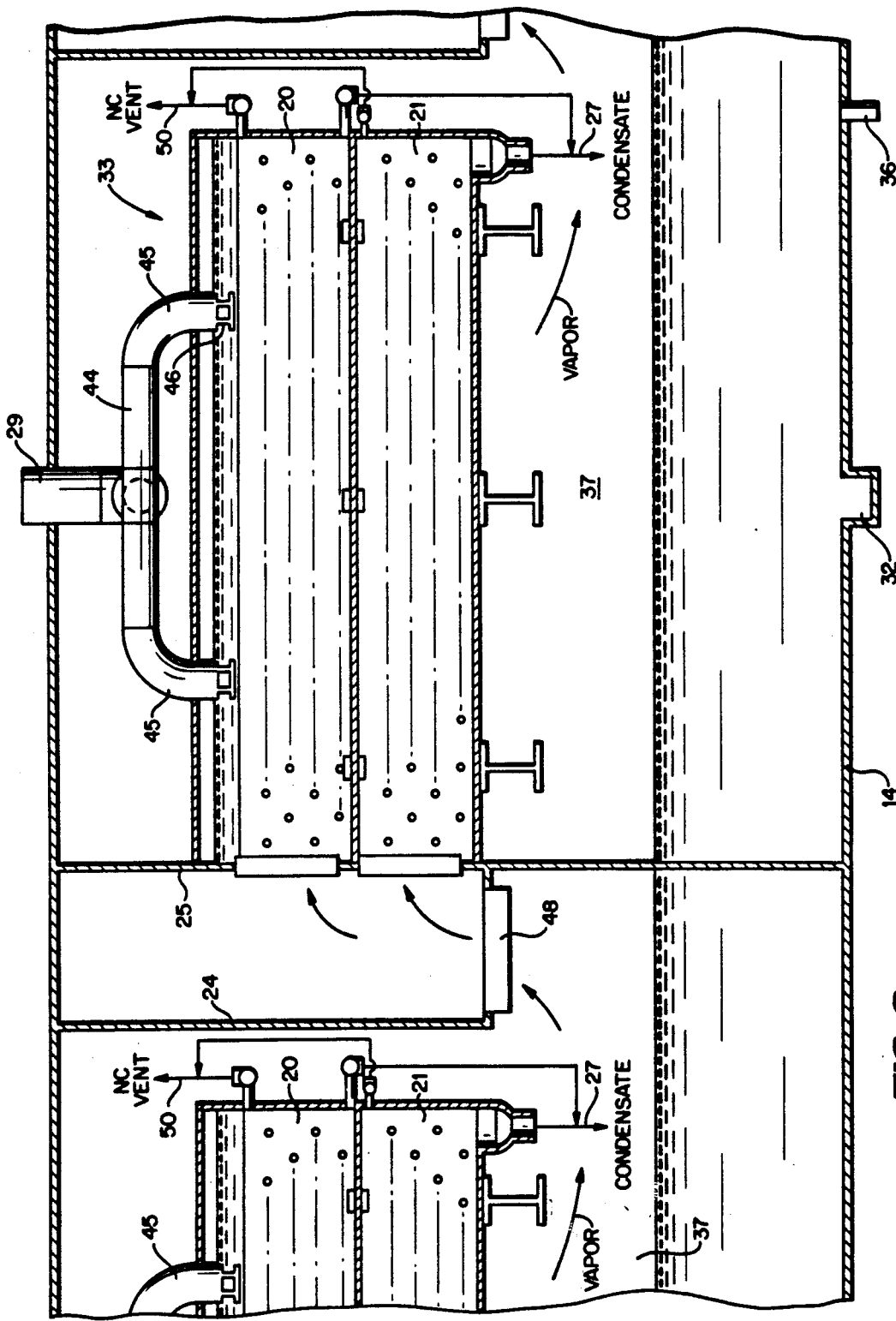
FIG. 6 is a side diagrammatic view showing the interconnection between two effects in detail, of a modification of the evaporator of FIG. 3.

The particular details of the mechanism for feeding the recirculation liquid from the conduit 29 are illustrated in FIGS. 4–6. The vertically extending conduit 29 is connected to a T 40 which includes first and second ends 41, 42, each of which opens up into a central portion of a transverse conduit 43, 44, respectively. The open ends of conduits 43, 44 are elbows 45, which discharge at about the level of liquid in the tray 33. Supports 46 (see FIGS. 4 and 6) may be provided for spacing the open bottom ends of the elbows 45 from the horizontally extending bottom 38 of the tray 33.

That part of the circulation liquid falling in a film over the elements of the sets 20, 21 that is evaporated passes through a demistor or mist separator 48. In the demistor 48 entrained liquid droplets are removed from the vapor, which droplets fall along with non-evaporated circulation liquid, as well as any condensate within the effect, into the sump 37. The vapor itself then passes through outlet 49 to become the heating fluid inlet 23 for the next effect.

Non-condensable gases are also withdrawn from each effect. The non-condensable gases pass through conduit 50 through an orifice 51 or valve 52 to a line 53. The line 53 is connected to a common pump (or steam ejector) 54 for all of the non-condensable gases, and which also can provide a partial vacuum in each effect, passing the non-condensable gases to a discharge area 55. As will be described with respect to FIG. 3, preferably the majority of the heat value of the non-condensable gases is recovered before they are actually discharged.

The clean condensate from chamber 26—as earlier described—preferably passes through outlet 27 to the clean condensate chamber 26 associated with the next effect. The level in the condensate chamber 26 is controlled by the level controller 57, which operates the valve (or orifice) 58 in line 27 to either allow (and control the flow rate of) or prevent the movement of condensate from one effect to the next effect.

The inlet liquid to be evaporated is provided from source 59. In the exemplary embodiment illustrated in FIG. 2 the source 59 is a source of saline, e.g. sea water. The sea water first passes through the cooler 60 to cool the condensate/product water in conduit 27 from the last effect (effect 3), after cooling the final product (desalinated/fresh) water being provided at conduit 62. From cooler 60 the saline water passes in conduit 62 to the interior of a dedicated set of elements; e.g. the first set 20 of the last effect (effect 3), and flows horizontally and countercurrently to the flow of vapor from the first effect to the last effect. The saline water continues to flow in conduit 62 until that conduit intersects the recirculation conduit 30 of the first effect, and thereafter provides the inlet evaporable water for the entire evaporator 10. Of course by passing through the cooler 60 (where it picks up heat) and then through the first set 20 of dimpled plate evaporator elements in all the effects except for the first, the saline water is preheated so that it will more easily evaporate. External tubing shell preheaters (not shown) rising vapor from the preceding effect can also be used to countercurrently preheat the saline water.

Another portion of the saline water from inlet 59 passes to cooler 63. The heated inlet saline water then either passes through line 64 to join with line 62, or is returned (e.g. to the ocean) as normal salt concentration saline 65. The liquid that is cooled in cooler 63 is the liquid withdrawn —and not circulated—from the sump 37 of the last effect through line 36 therefrom. This liquid is concentrated saline water, and after having a portion of the heat recovered therefrom in cooler 63, passes to disposal at 66.

In the FIG. 2 embodiment, fresh steam for the line 23 to the first effect is not readily available, therefore a vapor compressor 67 is provided. The vapor compressor utilizes electricity to increase the temperature and pressure of the vapor recirculated in line 68 from the vapor outlet 49 of the last effect (the third effect).

While the invention is not restricted to the particular temperature ranges or flow volumes illustrated, FIG. 2 does indicate exemplary temperatures of various fluids at different points in the system.

Figure 3B:
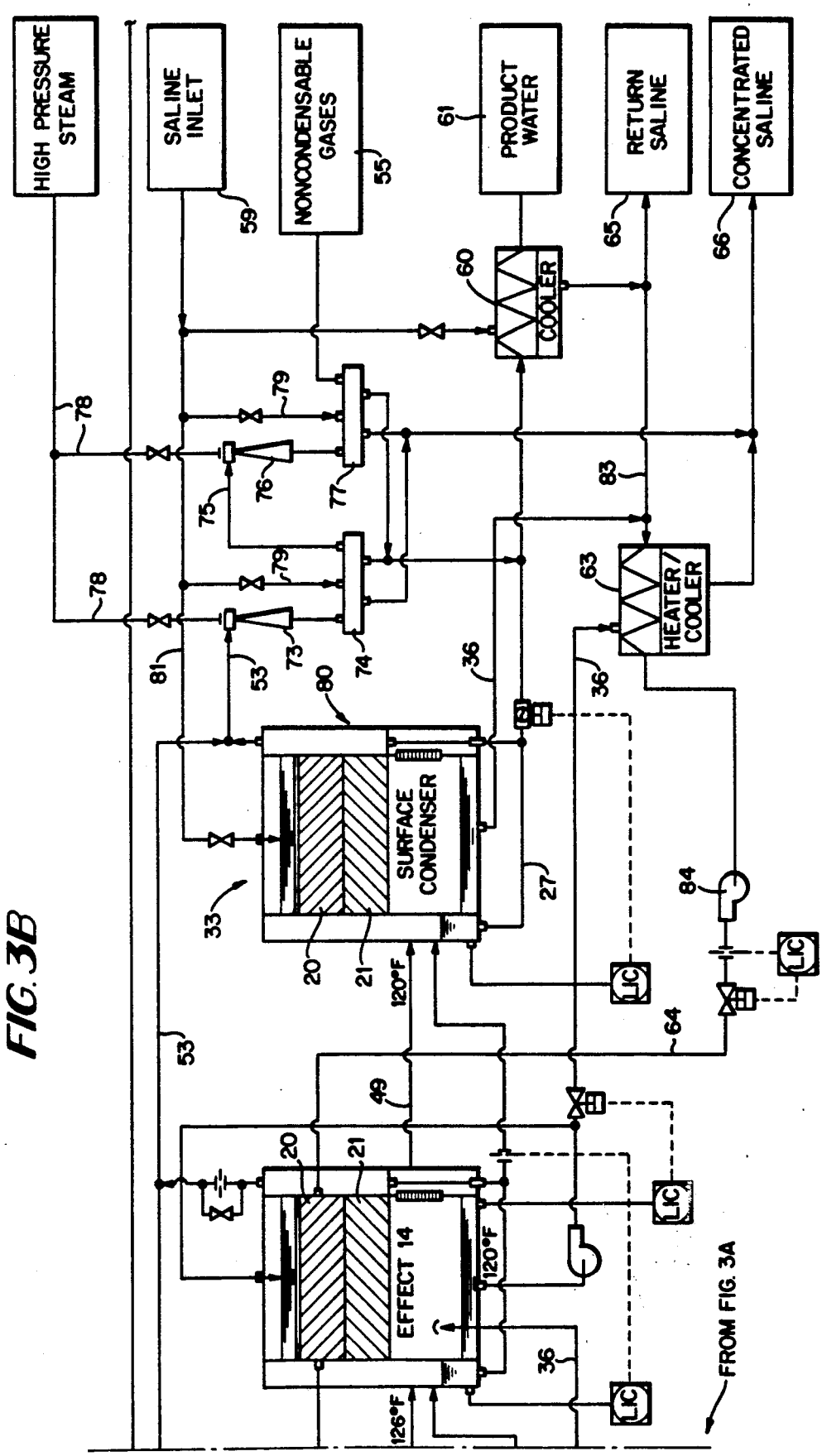
FIG. 3 (FIGS. 3A and 3B) is a schematic view—like that of FIG. 2—for a fourteen effect evaporator with clean low pressure steam as the heating fluid, with all except the first two and last two effects removed for clarity of illustration, that may be utilized in the vessel of FIG. 1.

FIG. 3 illustrates a multiple effect evaporator 10 where a source of low pressure steam 69 is readily available. In this particular embodiment fourteen effects are utilized, however more or less effects than that may be used instead. In this embodiment structures the same as those in the FIG. 2 embodiment are illustrated by the same reference numeral.

The basic structure and operation of the system of FIG. 3 is the same as that of FIG. 2 except for the following distinctions:

From the clean condensate chamber 26 of the first effect, liquid that is withdrawn in conduit 27 does not pass to the next effect, but rather is withdrawn by the pump 70—as controlled by the level controller 71—to a source of clean condensate 72, which is ultimately reheated to provide (along with fresh make-up water) the low pressure steam source 69.

Structures for recovering the majority of the heat value from the non-condensable gases in line 53 are provided. They preferably takes the form of a conventional steam ejector 73, which is connected to a condenser 74, an outlet of which is connected via line 75 to a second steam ejector 76, in turn connected to a second condenser 77. High temperature steam is supplied via lines 78 to the steam ejectors 73, 76. The heat in the condensers 74, 77 is recovered by saline inlet 59 passing through lines 79.

After the last (fourteenth) effect, the vapor in line 49 passes to a surface condenser 80. The surface condenser 80 has a construction much like each of the individual effects, except that inlet saline does not pass through the interior passage of the first set of dimpled plate evaporator effects 20, but rather is fed to the tray 33 at the top thereof, from line 81 connected to saline source 59, to flow in a film over the exterior surfaces of the elements 20, 21. The withdrawn condensate in line 27 from the surface condenser 80 passes to the cooler 60, where it is cooled and ultimately produces the product water 61. Withdrawn circulation water in line 36 from the surface condenser 80 mixes with the heated (by cooler 60) inlet saline in line 83, is heated even further in the heater/cooler 63, and then passes in line 64, under the motive force from the pump 84, to the first set 20 of the last effect of the evaporator 10. In addition to heating the inlet liquid, the heater/cooler 63 cools the withdrawn, concentrated saline, circulation liquid in conduit 36 from the fourteenth effect.

The recirculation liquid and the withdrawn recirculation liquid are removed from the same outlet 32 by pump 31. That is, the recirculation line 30 and the circulation withdrawal conduit 36 are both connected to the pump 31, rather than being separably connected as in the FIG. 2 embodiment.

While the embodiment of FIG. 3 has been described with respect to desalinization of saline, the temperatures indicated are for black liquor evaporation. When actually used for desalinization, the low pressure steam from source 69 typically would have a temperature of 212°, and instead of each of the effects being pressurized they would be under varying degrees of vacuum.

FIG. 6 illustrates a slightly different embodiment of components than that illustrated in FIGS. 1 through 5. In FIG. 6, vapor from one effect flows as heating fluid to both sets of elements 20, 21 of the next effect, after passing through the mist separator 48. Non-condensable gases are thus withdrawn into conduit 50 from the tops of both sets 20, 21, and clean condensate is withdrawn from the bottoms of both sets 20, 21 at the far end of the effect, rather than at the near end (as illustrated in FIGS. 2 and 3). In this embodiment the evaporable liquid is either not preheated (perhaps because it does not need preheating—e.g. it is black liquor from certain paper pulp processes) or preheating is provided by an external tube shell heater (not shown).

Operation

Utilizing the multiple effect evaporator 10 the following method steps may be practiced. While the invention will be described with respect to two sets of elements, it is to be understood that any number (one or more) of sets may be utilized.

Heating fluid from source 69 or vapor compressor 67 is introduced horizontally in line 23 into the internal passage of both sets 20, 21 of dimpled plate evaporator elements of the first effect, and evaporated vapor into the internal passage of at least the second set 21 and all subsequent effects. A head of circulation liquid is provided in tray 33 at the top of the first set of each effect, and is caused to flow downwardly from the head over the external surfaces of the dimpled plate evaporator elements of both sets 20, 21 of each effect. That portion of the circulation liquid which is evaporated is demisted by demistor 48 to separate liquid from the vapor, is recirculated from each effect to the head (tray 33) associated with that effect via pump and recirculation line 30. The vapor withdrawn through demistor 48 in line 49 is fed from each effect to the next effect as the heating fluid, except for in the last effect. In the last effect, the vapor is either passed in line 68 to have the temperature thereof raised by vapor compressor 67, or it is passed through surface condenser 80 where it condenses and is withdrawn through the line 27 thereof as clean condensate. In any event clean condensate is withdrawn through line 27 from the last effect to provide an end product—typically fresh water.

The product liquid from conduit 27 from the last effect, or surface condenser 80, passes through cooler 60, where the temperature thereof is lowered to about 80° F. or below. Non-condensable gases are withdrawn in conduit 53, and preferably heat is recovered therefrom utilizing steam ejectors 73, 76, condensers 74, 77, and like components (see FIG. 3). Ultimately product water passes to 61, return saline of the same concentration as the inlet saline to 65, and concentrated saline to 66.

It will thus be seen that according to the present invention a method of evaporating an evaporable liquid, a multi-effect evaporator, and particular effects for the multiple effect evaporator, have been provided which are advantageous. According to the invention capital costs are saved compared to vertical dimpled plate evaporators, and more uniform liquor distribution, less vapor pressure drop between heating elements, better droplet separation (less carryover), and/or higher heat transfer coefficients are provided compared to horizontal tubular evaporators. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and procedures.

What is claimed is:

1. A method of evaporating an evaporable liquid using a multiple effect evaporator having at least one set of horizontally elongated dimpled plate evaporator elements disposed in each effect, each set having an internal passage and an external surface, the effects connected in series and including a first, highest temperature, effect and a last, lowest temperature, effect; comprising the steps of:

(a) introducing horizontally flowing heating fluid into the internal passage of horizontally elongated dimple plate evaporator elements of the first effect, and into the internal passage of horizontally elongated dimple plate evaporator elements in all subsequent effects;

(b) providing a head of circulation liquid to be evaporated at the top of a set of each effect;

(c) causing the liquid to flow downwardly from the head over the external surfaces of the elements of each effect to the bottom of each effect;

(d) withdrawing the vapor of evaporated circulation liquid from each effect while demisting it to separate liquid from the vapor;

(e) recirculating circulation liquid that has not evaporated from the bottom of each effect to the head associated with that effect;

(f) horizontally feeding the withdrawn vapor from each effect to the next effect as the fluid provided in step (a) thereof, except for the last effect;

(g) effecting condensation of vapor fed as the fluid provided in step (a) for the last effect to product clean condensate; and (h) withdrawing clean condensate from the last effect.

2. A method as recited in claim 1 wherein said at least one set comprises at least first and second sets, the first set disposed on top of the second set for each effect, and the head of circulation liquid provided at the top of the first set of each effect.

3. A method as recited in claim 1 wherein step (a) is practiced for the first effect by introducing steam into the first effect.

4. A method as recited in claim 2 comprising the further step (i) of preheating the liquid to be evaporated before introducing it into the head of the first effect by passing it through the internal passages of the first sets of all the other effects except the first effect, the liquid flowing countercurrent to the vapor passing from the first effect to the last effect through the second sets' internal passages.

5. A method as recited in claim 4 wherein the liquid to be evaporated is saline water, and wherein the clean condensate from step (h) is fresh water.

6. A method as recited in claim 5 comprising the further step of cooling the fresh water from step (h) to about 80° F., or below.

7. A method as recited in claim 1 wherein the liquid to be evaporated is saline water, wherein the condensate from step (h) is fresh water.

8. A method as recited in claim 7 comprising the further step of cooling the fresh water from step (h) to about 80° F., or below.

9. A method as recited in claim 1 comprising the further step (i) of compressing the vapor withdrawn from the last effect to increase the temperature thereof, and providing the compressed vapor to the first effect as the heating fluid in step (a).

10. A method as recited in claim 1 comprising the further step (j) of removing non-condensable gases from each effect, and recovering a major portion of the heat value from the non-condensable gases before discharge thereof.

11. A method as recited in claim 1 comprising the further step (k), for each effect except the last effect, between steps (f) and (a) of collecting condensate and flashing it, and passing the condensate so flashed and collected to the next effect.

12. A method as recited in claim 1 wherein the liquid to be evaporated is black liquor from a paper pulp producing procedure.

13. An evaporator effect, comprising:
a horizontally elongated vessel, having a top, bottom, first end, and second end;
a first set of elongated in a dimension of elongation dimpled plate evaporator elements, defining an interior passage, and having an exterior surface;
means for introducing heating fluid into the interior passage of said dimpled plate evaporator elements;
means for mounting said first set of dimpled plate evaporator elements so that they are disposed in said vessel with their dimension of elongation horizontal;
means for introducing circulation liquid to be evaporated adjacent the top of said vessel so that it falls over the exterior surfaces of said elements in a falling film, to cause some of said circulation liquid to be evaporated;
a demistor mounted within said vessel;
means for withdrawing evaporated circulation liquid from said vessel through said demistor;
means for causing circulation liquid not evaporated, to collect at the bottom of said vessel; and
a circulation liquid outlet from the bottom of said vessel.

14. An evaporator effect as recited in claim 13 further comprising a second set of dimpled plate evaporator elements elongated in a dimension of elongation, defining an interior passage and having an exterior surface; said first set mounted on top of said second set, with said second set dimension of elongation horizontal.

15. An evaporator effect as recited in claim 14 wherein said means for introducing heating fluid introduces heating fluid to the interior passages of both said first and second sets of elements.

16. An evaporator effect as recited in claim 13 wherein said means for introducing circulation liquid comprises an open top, closed bottom tray mounted above said elements, and means defining a plurality of openings in said tray bottom, disposed uniformly over said tray bottom.

17. An evaporator effect as recited in claim 14 further comprising means for introducing liquid to be preheated into the interior passage of said first set of elements, to flow countercurrently to the fluid introduced into the interior passage of said second set of elements.

18. An evaporator effect as recited in claim 13 further comprising a wall separating said means for collecting circulation liquid at the bottom of said vessel from said means for introducing heating fluid, and a heating fluid condensate chamber at the bottom of said vessel on the opposite side of said wall from said means for collecting circulation liquid; and an outlet from said condensate chamber.

19. An evaporator effect as recited in claim 14 further comprising means for removing non-condensable gases from a top portion of at least said second set of dimple plate evaporator elements.

20. An evaporator effect as recited in claim 16 wherein said means for introducing circulation liquid further comprises a vertically extending conduit disposed above said tray and terminating in a T having first and second ends, each of said first and second ends of said T being connected to a central portion of a pipe having open ends, with an elbow at each open end of each pipe, said elbows having a discharge opening therein disposed above the bottom of said tray to distribute liquid into said tray from said vertically extending conduit.

21. An evaporator effect as recited in claim 14 further comprising at least one additional set of elongated in a dimension of elongation dimpled plate evaporator elements mounted between said first and second sets.

22. A multi-stage evaporator having a plurality of effects which are interconnected into a series of effects from a first, highest temperature, to a last, lowest temperature, effect, each effect in the series comprising:
a horizontally elongated vessel, having a top, bottom, first end, and second end;
a first set of elongated in a dimension of elongation dimpled plate evaporator elements, defining an interior passage, and having an exterior surface;
a second set of elongated in a dimension of elongation dimpled plate evaporator elements, defining an interior passage, and having an exterior surface;
means for introducing heating fluid into the interior passage of at least said second set of dimpled plate evaporator elements;
means for mounting said first and second sets of dimpled plate evaporator elements so that they are disposed in said vessel with their dimension of elongation horizontal, with said first set above said second set;
means for introducing circulation liquid to be evaporated adjacent the top of said vessel so that it falls over the exterior surfaces of said first and second sets of elements in a falling film, to cause some of said circulation liquid to be evaporated;
a demistor mounted within said vessel;
means for withdrawing evaporated circulation liquid from said vessel through said demistor;
means for causing circulation liquid not evaporated, and liquid separated by said demistor, to collect at the bottom of said vessel; and
a circulation liquid outlet from the bottom of said vessel; and wherein
for each effect except said first effect, said means for introducing heating fluid being connected to said means for withdrawing evaporated circulation liquid from the previous effect.

23. An evaporator as recited in claim 22 further comprising, for each effect except the first effect, means for introducing liquid to be preheated into the interior passage of said first set of elements, to flow concurrently to the fluid introduced into the interior passage of said second of elements, and means for introducing liquid from said first set of elements of said second effect to said means for introducing circulation liquid of said first effect.

24. An evaporator as recited in claim 22 wherein each effect comprises: a wall separating said means for collecting circulation liquid at the bottom of said vessel from said means for introducing heating fluid, and a heating fluid condensate chamber at the bottom of said vessel on the opposite side of said wall from said means for collecting circulation liquid; and an outlet from said condensate chamber; said condensate outlet from each of said effects except said last effect being connected to said condensation chamber of the next effect, and said condensate outlet from said last effect providing product liquid.

25. An evaporator as recited in claim 24 further comprising a cooler operatively connected to the condensate outlet from said last effect for lowering the temperature of the product liquid therein.

26. An evaporator as recited in claim 25 further comprising an outlet for non-condensable gases associated with each effect, and means for recovering heat from the non-condensable gases before venting thereof.

27. An evaporator as recited in claim 26 wherein said means for recovering heat from said non-condensable gases comprises at least one steam ejector operatively connected to a condenser.

28. An evaporator as recited in claim 22 further comprising a vapor compressor operatively connected between means for withdrawing evaporated vapor from the last effect and means for introducing compressed vapor as heating fluid into the interior passage of both the first and second sets of dimpled plate evaporator elements in the first effect.

29. An evaporator as recited in claim 22 further comprising means for sensing the level of circulation liquid collected at the bottom of each effect of said vessel, and if said level is greater than a predetermined amount, passing some of the collected recirculation liquid to the means for collecting recirculation liquid of the next effect, except for said last effect; for said last effect, means for passing circulation liquid more than said predetermined level to a heater for preheating evaporable liquid.

30. An evaporator as recited in claim 22 further comprising means for drawing a partial vacuum in each of said effects, so that the pressure in said first effect is the highest, and each subsequent effect has a slightly lower pressure than the previous effect.

* * * * *